United States Patent
Allen et al.

(10) Patent No.: US 6,847,930 B2
(45) Date of Patent: Jan. 25, 2005

(54) ANALOG VOICE ACTIVITY DETECTOR FOR TELEPHONE

(75) Inventors: Justin L. Allen, Mesa, AZ (US); Steven M. Domer, Mesa, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 367 days.

(21) Appl. No.: 10/057,104

(22) Filed: Jan. 25, 2002

(65) Prior Publication Data

US 2003/0142812 A1 Jul. 31, 2003

(51) Int. Cl.$^7$ .............................................. G10L 11/02
(52) U.S. Cl. ...................................... 704/233; 704/215
(58) Field of Search ................................. 704/215, 233, 704/210, 226

(56) References Cited

U.S. PATENT DOCUMENTS

| | | | | |
|---|---|---|---|---|
| 3,875,339 A | | 4/1975 | Gruen et al. ............. 179/15 FD |
| 4,008,375 A | * | 2/1977 | Lanier ......................... 704/250 |
| 4,610,023 A | | 9/1986 | Noso et al. ..................... 381/43 |
| 4,720,862 A | | 1/1988 | Nakata et al. ................. 381/38 |
| 4,796,287 A | | 1/1989 | Reesor et al. ................ 379/390 |
| 4,879,745 A | | 11/1989 | Arbel ........................... 379/389 |
| RE33,739 E | * | 11/1991 | Takashima et al. ............ 84/603 |
| 5,241,649 A | * | 8/1993 | Niyada ......................... 704/234 |
| 5,323,337 A | | 6/1994 | Wilson et al. ................ 364/574 |
| 5,418,848 A | | 5/1995 | Armbrüster .................. 379/406 |
| 5,598,466 A | | 1/1997 | Graumann ................... 379/389 |
| 5,692,042 A | | 11/1997 | Sacca .......................... 379/387 |
| 5,764,753 A | | 6/1998 | McCaslin et al. ........... 379/389 |
| 5,867,574 A | | 2/1999 | Eryilmaz ..................... 379/389 |
| 6,138,040 A | | 10/2000 | Nicholls et al. ............. 455/569 |
| 6,212,273 B1 | | 4/2001 | Hemkumar et al. ........ 379/410 |
| 6,282,176 B1 | | 8/2001 | Hemkumar .................. 370/276 |
| 6,427,134 B1 | * | 7/2002 | Garner et al. ................ 704/233 |

FOREIGN PATENT DOCUMENTS

JP          2000-310993    * 11/2000 ........... G10L/11/02

* cited by examiner

*Primary Examiner*—Daniel Abebe
(74) *Attorney, Agent, or Firm*—Paul F. Wille

(57) ABSTRACT

Voice activity is detected by comparing an analog signal with two voltage thresholds and producing data representing the energy of the signal. The data, in binary form, is compared with thresholds to determine voice activity. In accordance with another aspect of the invention, the thresholds are adjusted based upon statistical information. In accordance with another aspect of the invention, the data can be weighted to provide an indication of the quasi-RMS energy of an input signal. The input signal itself is not converted into digital form yet the data derived from the input signal has high resolution.

10 Claims, 5 Drawing Sheets

ANALOG VOICE ACTIVITY DETECTOR FOR TELEPHONE

CROSS-REFERENCE TO RELATED APPLICATIONS

This application relates to application Ser. No. 09/803,551, filed Mar. 9, 2001, entitled Transmit/Receive Arbitrator, and assigned to the assignee of this invention. This application also relates to application Ser. No. 09/476,468, filed Dec. 30, 1999, entitled Band-by-Band Full Duplex Communication, and assigned to the assignee of this invention. The entire contents of these applications are hereby incorporated by reference into this application. This application also relates to application Ser. No. 10/057,160, filed on even date herewith, entitled Telephone Having Four VAD Circuits, and assigned to the assignee of this invention. This application also relates to application Ser. No. 10/056,826, filed on even date herewith, entitled Voice Activity Detector for Telephone, and assigned to the assignee of this invention.

BACKGROUND OF THE INVENTION

This invention relates to a voice activity detector and, in particular, to a circuit that provides a stable indication of voice activity for use in communication systems, such as speaker phones and other applications.

The detector described herein is referred to as a voice activity detector but is not so limited in function. As will be apparent from a complete understanding of the invention, the detector can be adjusted to messages of various kinds, e.g. fax signals, not just voice signals. Calling the detector a "message" activity detector or a "communication" activity detector is not more clear than the more familiar term of voice activity detector and, therefore, these terms are not used.

Anyone who has used current models of speaker phones is well aware of the cut off speech and the silent periods during a conversation caused by echo canceling circuitry within the speaker phone. Such phones operate in what is known as half-duplex mode, which means that only one person can speak at a time. While such silent periods assure that the sound from the speaker is not coupled directly into the microphone within a speaker phone, the quality of the call is poor.

Whether or not to receive (listen) or transmit (talk) is not easily resolved in the particular application of telephone communication. Voices may overlap, so-called "double talk," particularly if there are more than two parties to a call. Background noise may cause problems if the noise level is a significant percentage of the voice level. Pauses in a conversation do not necessarily mean that a person is finished speaking and that it is time for someone else to speak. A voice signal is a complex wave that is discontinuous because not all speech sounds use the vocal chords. Analyzing a voice signal in real time and deciding whether or not a person has finished speaking is a complex problem despite the ordinary human experience of doing it unconsciously or subconsciously. A variety of electronic systems have been proposed in the prior art for arbitrating send or receive but the problem remains.

U.S. Pat. No. 4,796,287 (Reesor et al.) discloses a speaker phone in which a decremented counter provides a delay to channel switching by the remainder of the circuit. The magnitudes of the line signal and the microphone signal are used in determining whether or not to switch channels.

U.S. Pat. No. 4,879,745 (Arbel) discloses a half-duplex speaker phone that controls the selection of either a transmit or a receive audio path based upon a present state of the speaker phone and the magnitudes of three variables associated with each path. The three variables for each path include signal power, noise power, and worst-case echo.

U.S. Pat. No. 5,418,848 (Armbrüster) discloses a double talk detector wherein an evaluation circuit monitors voice signals upstream and downstream of echo canceling apparatus for detecting double talk. An up-down counter is incremented and decremented at different rates and a predetermined count is required before further signal processing takes place.

U.S. Pat. No. 5,598,466 (Graumann) discloses a voice activity detector including an algorithm for distinguishing voice from background noise based upon an analysis of average peak value of a voice signal compared to the current number of the audio signal.

U.S. Pat. No. 5,692,042 (Sacca) discloses a speaker phone including non-linear amplifiers to compress transmitted and received signals, and level detectors to determine the levels of the compressed transmitted and received signals. The compressed signals are compared in a comparator having hysteresis to enable either transmit mode or receive mode.

U.S. Pat. No. 5,764,753 (McCaslin et al.) discloses a double talk detector that compares the send and receive signals to determine "Return Echo Loss Enhancement," which is stored as a digital value in a register. The digital value is adjusted over time and is used to provide a variable, rather than fixed, parameter to which new data is compared in determining whether to send or receive.

U.S. Pat. No. 5,867,574 (Eryilmaz) discloses a voice activity detection system that uses a voice energy term defined as the sum of the differences between consecutive values of a speech signal. Comparison of the voice energy term with threshold values and comparing the voice energy terms of the transmit and receive channels determines which channel will be active.

U.S. Pat. No. 6,138,040 (Nicholls et al.) discloses comparing the energy in each "frame" (thirty millisecond interval) of speech with background energy to determine whether or not speech is present in a channel. A timer is disclosed for bridging gaps between voiced portions of speech.

Typically, these systems are implemented in digital form and manipulate large amounts of data in analyzing the input signals. The Sacca patent discloses an analog system using an amplifier with hysteresis to avoid dithering, which, to a large extent, is unavoidable with a simple amplitude comparison. On the other hand, an extensive computational analysis to determine relative power takes too long. The Eryilmaz patent attempts to simplify the amount of computation but still requires manipulation of significant amounts of data. All these systems manipulate amplitude data, or data derived from amplitude, up to the point of making a binary value signal indicating voice.

One can increase the speed of a system by reducing the amount of data being processed. Unfortunately, this typically reduces the resolution of the system. For example, all other parameters being equal, eight bit data is more quickly processed than sixteen bit data. The problem is that resolution is reduced. In an acoustic environment, the quality or fidelity of the audio signal requires a minimum amount of data. Thus, the problem remains of speeding up a system other than by simply increasing the clock frequency.

Some of the prior art systems use historical data, e.g. three occurrences of what is interpreted as a voice signal. Such systems require large amounts of memory to handle the historical data and the current data.

Voice detection is not just used to determine transmit or receive. A reliable voice detection circuit is necessary in order to properly control echo cancelling circuitry, which, if activated at the wrong time, can severely distort a desired voice signal. In the prior art, this problem has not been solved satisfactorily.

In view of the foregoing, it is therefore an object of the invention to provide an improved method for analyzing the energy content of an incoming signal.

Another object of the invention is to provide a simple but effective circuit for detecting voice.

A further object of the invention is to provide a circuit having dynamically adjustable thresholds for analyzing energy content of a speech signal.

Another object of the invention is to provide a voice activity detector that does not require large amounts of data for reliable detection of a voice signal.

A further object of the invention is to provide an apparatus and a method for analyzing the envelope of a signal with minimal computation.

Another object of the invention is to provide an apparatus and a method for analyzing a signal that is less hardware intensive than in the prior art.

A further object of the invention is to provide an apparatus and a method for analyzing a signal that is faster than in the prior art.

Another object of the invention is to reduce the amount of data being processed without reducing the resolution of the system.

A further object of the invention is to provide reliable activation of echo cancelling circuitry.

SUMMARY OF THE INVENTION

The foregoing objects are achieved in this invention in which voice activity is detected by comparing an analog input signal with two voltage thresholds and producing data representing the energy of the signal. The data, in binary form, is compared with thresholds to determine voice activity. In accordance with another aspect of the invention, the thresholds are adjusted based upon statistical information. In accordance with another aspect of the invention, the numbers are weighted to provide an indication of the quasi-RMS energy of an input signal. The input signal itself is not converted into digital form yet the data derived from the input signal has high resolution.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
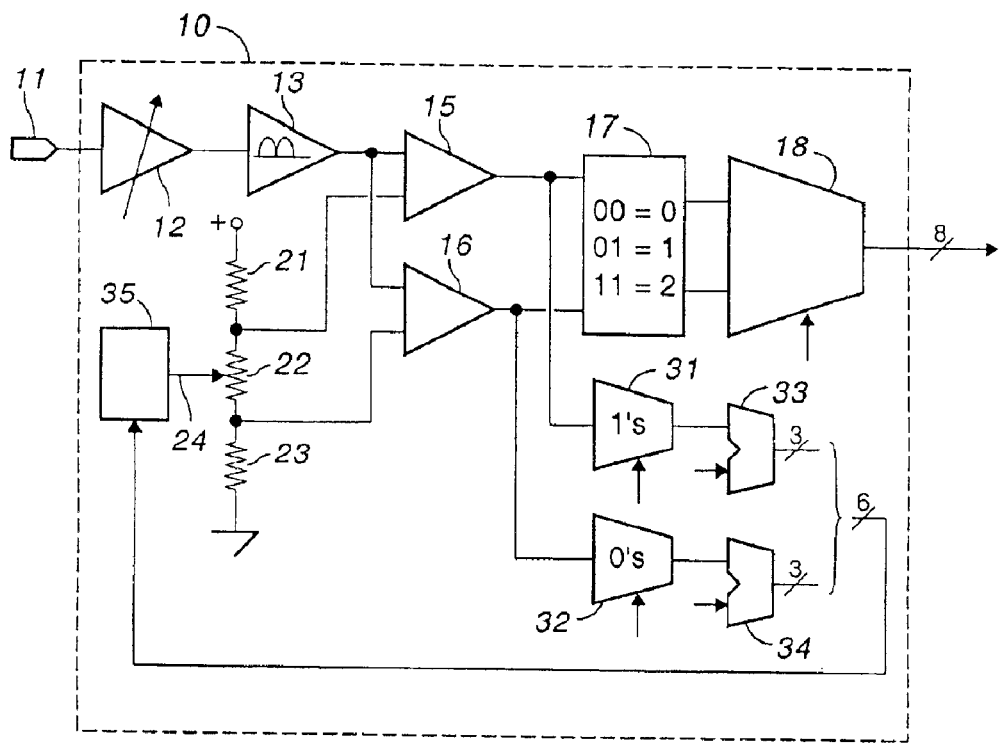
FIG. 1 is a block diagram of a voice energy quantizer constructed in accordance with one aspect of the invention.

FIG. 1 is a block diagram of adjustable, three level quantizer 10 for providing a digital indication of the energy in an analog signal on input 11. The signal is coupled through variable gain amplifier 12 to full wave rectifier 13. Full wave rectification enables the quantizer to provide a better indication of energy content. The output from rectifier 13 is coupled to one input of each of comparators 15 and 16. The outputs of comparators 15 and 16 are coupled to decoder 17, which decodes the signals to produce a binary output of 0 (zero), 1, or 2. Accumulator 18 adds the output from decoder 17 to the previous sum on each clock signal for one hundred twenty-eight cycles. Accumulator 18 sums for 2.9 milliseconds and then resets to zero.

A source of variable reference signals is represented in FIG. 1 by resistors 21, 22. 23, and tap 24. The resistors are coupled in series between supply and ground or common. The junction of resistors 21 and 22 is coupled to one input of comparator 15 and the junction of resistors 22 and 23 is coupled to one input of comparator 16. Thus connected, the reference voltage applied to comparator 15 is more positive than the reference voltage applied to comparator 16. Accumulator 31 counts the number of ones from comparator 15 and accumulator 32 counts the number of zeros from comparator 16. The sums are compared with threshold values in comparators 33 and 34.

If the sum in accumulator 33 is too high, the reference voltage into comparator 15 is raised by control unit 35. If the sum in accumulator 34 is too high, the reference voltage into comparator 16 is raised by control unit 35. If the sum in accumulator 33 is too low, the reference voltage into comparator 15 is lowered by control unit 35. If the sum in accumulator 34 is too low, the reference voltage into comparator 16 is lowered by control unit 35. Additional circuitry (not shown) prevents the lower threshold from exceeding a maximum value and prevents the upper threshold from decreasing below a minimum value. These limits, stored in registers, are also adjustable.

Decoder 17 can produce any three numbers in response to the signals on its inputs. In this way data can be skewed or weighted to exaggerate the occurrence of a signal in a particular area, e.g. between the thresholds. A sum is easily and rapidly obtained with very simple hardware and avoids complex calculations for measuring power. A sum is one form of what is referred to herein as statistical data. The other form of data is a count of events, e.g. the number of times a threshold is exceeded. A count can also be weighted. The result is an extremely flexible system that rapidly analyzes an input signal using relatively simple hardware without analog to digital (A/D) conversion of the input signal but provides accurate digital data representing the input signal.

Figure 2:
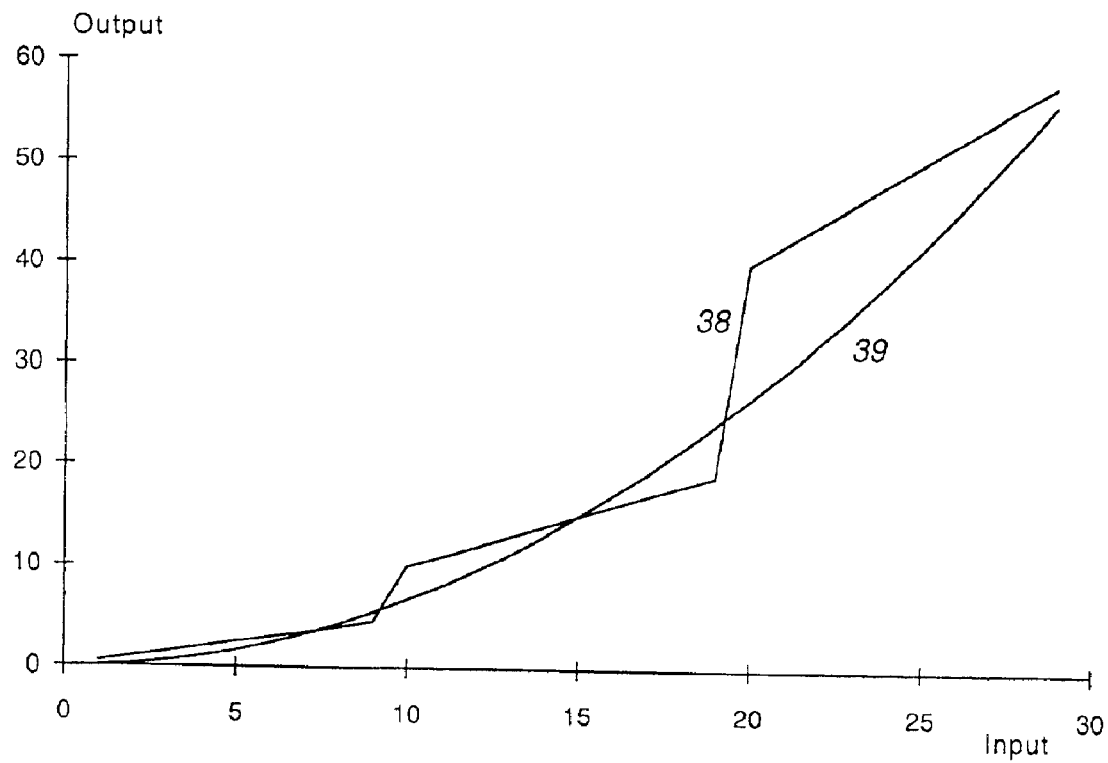
FIG. 2 is a chart illustrating a quasi-RMS calculation in accordance with another aspect of the invention.

Despite the seeming simplicity of circuit 10, several advantages are obtained over prior art circuits. Obviously, the simplicity of the circuit itself enables one to implement the circuit easily. The circuit is fast because one is creating a sum, not doing a series of complex calculations. Voice detection is easy, quick, and reliable. Less apparent is the fact that the circuit enables one to simulate a root mean square (RMS) calculation without actually having to make the calculation. As illustrated in FIG. 2, an RMS calculation is simulated by appropriate weighting of the outputs in decoder 17. As illustrated in FIG. 1, a weighting factor of 0, 1, 2 is used. In a digital version of the circuit, discussed below, a weighting of 0.5, 1.0, and 4.0 was used. The latter is the weighting illustrated in FIG. 2 by curve 38. Curve 39 represents a squared response. In both cases, the difference between loud signals and soft signals is exaggerated by giving greater weight to louder signals. The sum in accumulator 18 is indicative of RMS power, although not an exact measure. The circuit thus avoids a significant problem in circuits of the prior art by not actually calculating RMS power.

Another subtle but important advantage of quantizer 10 is the fact that, while only two bits are being produced, the resolution of the circuit is determined by the source of reference voltage. In digital form, the resolution of the circuit is determined by the resolution of the analog to digital (A/D) converters used to digitize the signal. If a sixteen bit A/D converter is used, than the resolution of the circuit is approximately VMAX/64,000, not just VMAX/4 as might be inferred from output data of only two bits.

A source of reference signals could be implemented as literally shown in FIG. 1 or a different source can be used. FIG. 1 is intended to illustrate processing an input signal to generate particular data that is used in the invention. More sophisticated analog to digital (A/D) converters are available in integrated circuit (IC) form or in design libraries for ICs. Digital comparators are used with such devices instead of analog comparators 15 and 16. In a preferred embodiment of the invention, the digital comparators work only on the six most significant bits (MSB) of data, which greatly simplifies implementing the invention.

Figure 3:
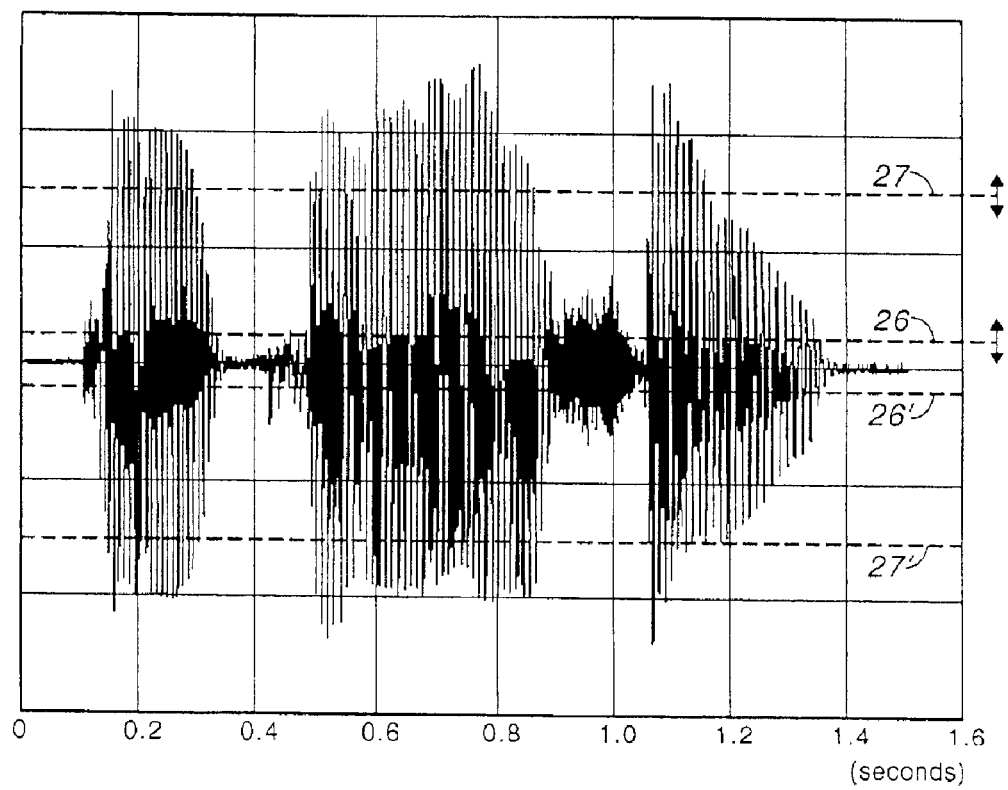
FIG. 3 is a chart representing a speech signal.

FIG. 3 is a chart representing a male voice saying the word "information" and illustrates the operation of the dual thresholds used in the circuit shown in FIG. 1. FIG. 3 is a representation of the unrectified signal on input 11. The amplitude of the input signal is divided into three adjustable regions. The lowest amplitude region is that of ambient sounds and noise. The middle region is speech and the highest region is that of speech peaks.

Referring to FIG. 1, an input signal below the threshold set by the reference voltage to comparator 16 causes a zero output from comparator 16 and a zero output from comparator 15. An input signal above the threshold set by the reference voltage to comparator 16 and below the threshold set by the reference voltage to comparator 15 causes a one output from comparator 16 and a zero output from comparator 15. An input signal above the threshold set by the reference voltage to comparator 15 causes a one output from comparator 16 and a one output from comparator 15. Thus, comparators 15 and 16 provide one of three combinations of bits to decoder 17, which converts each combination to a different two-bit binary output. The bit combination 1-0 is not possible because the input signal cannot be below minimum threshold and above maximum threshold simultaneously.

In FIG. 3, dashed line 26 represents the lower threshold and dashed line 27 represents the upper threshold. Dashed lines 26' and 27' are symmetrically located about zero from the corresponding unprimed lines and are provided for convenience. As seen in FIG. 3, portions of the sound of a single word occupy each of the three regions. In one embodiment of the invention, quantizer 10 (FIG. 1) provides a count every 2.9 mS representative of the energy content of the input signal. As indicated in FIG. 3, the word "information" lasts approximately 1.5 seconds, including initial and terminal quiet periods and is defined in over five hundred bytes of data from converter 18. Much fewer than five hundred bytes is used to determine voice activity.

In implementing a preferred embodiment of the invention, various time periods, voltage thresholds, and count thresholds must be chosen, at least as starting points, for the system to operate. A window of 1.5 seconds was arbitrarily chosen as the interval for collecting several items of data, such as calculating the noise floor, RMS signal value, and maximum signal. Such an interval includes three or four syllables of ordinary speech but is not so long as to slow down the system. A three millisecond interval is convenient for other data, such as detecting voice. The signal thresholds are defined as 75% and 10%. That is, threshold 26 is set to a value such that 75% of the signal is below the threshold. Threshold 27 is set to a value such that 10% of the signal is above the threshold. The thresholds are the same whether the quantizer is digital or analog.

Figure 4:
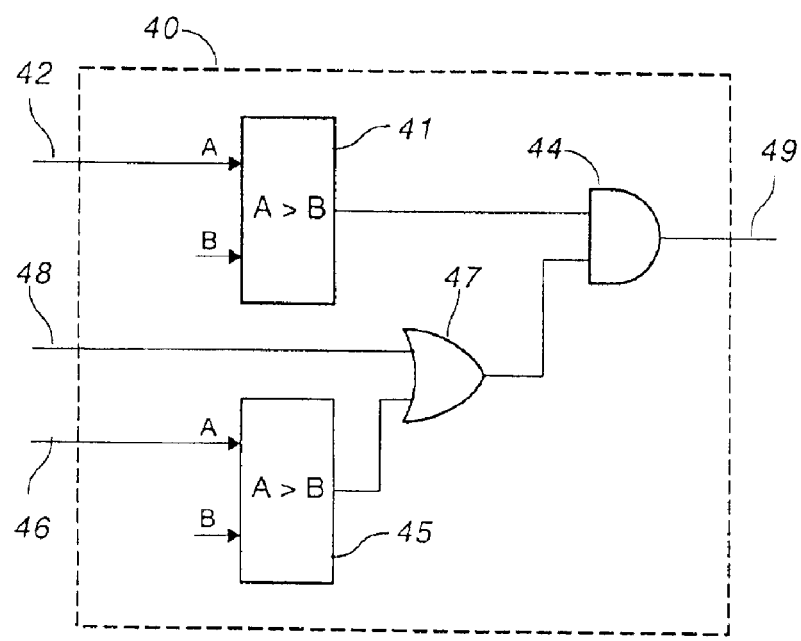
FIG. 4 is a block diagram of a voice activity detector constructed in accordance with a preferred embodiment of the invention.

FIG. 4 illustrates the logic for detecting voice on a single line. Voice activity detector 40 includes first comparator 41 coupled to input 42. Input 42 is a data bus coupled to accumulator 18 (FIG. 1), which provides a number representative of the RMS energy in the incoming signal. The total from accumulator 18 is compared with a threshold and the output of comparator 41 is coupled to AND gate 44. Detector 40 includes second comparator 45 having input 46 coupled to the output of accumulator 33 (FIG. 1), which counts peaks, i.e. the number of times that upper threshold 27 (FIG. 3) is exceeded. The total from accumulator 33 is compared with a second threshold by comparator 45 and the output of comparator 45 is coupled to one input of OR gate 47. Another input to OR gate 47 is coupled to input 48, which is coupled to logic (not shown) that provides a logic "1" (true) if the peak threshold is at its minimum. Constructed as shown in FIG. 3, output 49 is a logic "1" if the signal accumulator is above the first threshold AND (the number of peaks is above the second threshold OR the peak threshold is at its minimum). A logic "1." on output 49 indicates that voice is detected.

Figure 5:
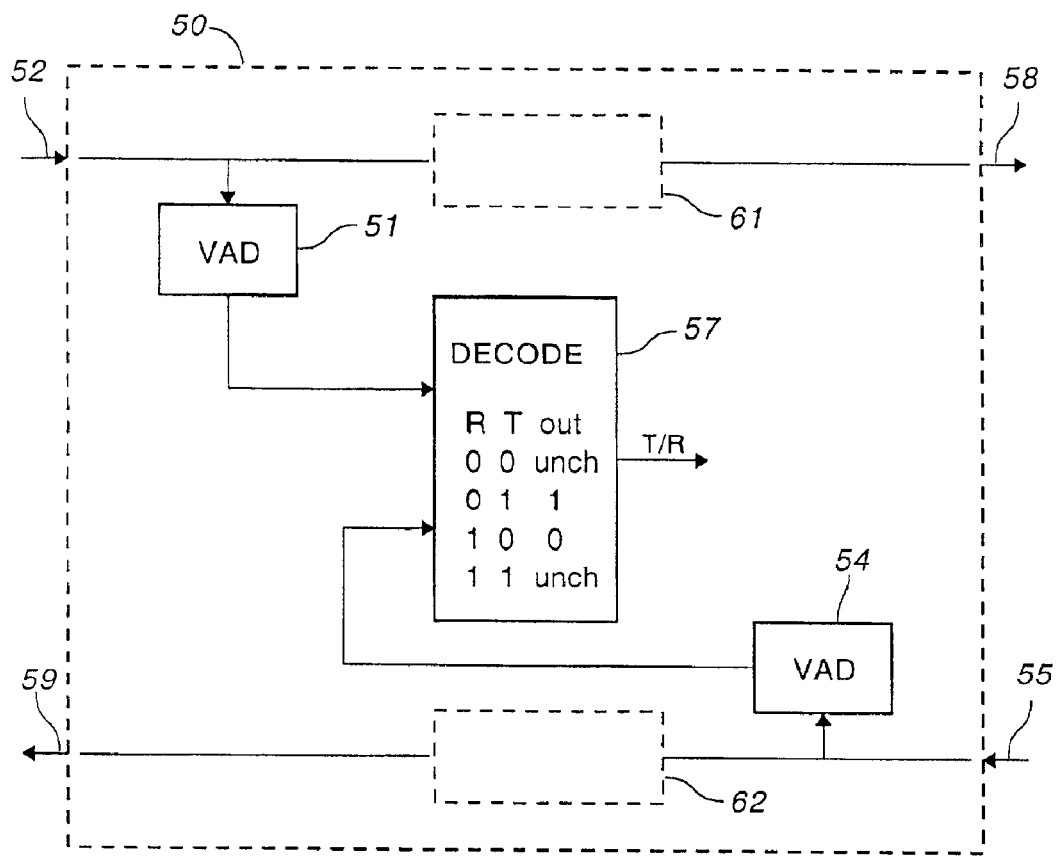
FIG. 5 is a block diagram of a circuit for controlling signal flow.

FIG. 5 is a block diagram of a telephone including two voice activity detectors. Specifically, telephone 50 includes detector 51 on microphone input 52 and detector 54 on line input 55. The outputs from the detectors are coupled to decoder 57, which determines whether the signal from microphone input 52 is coupled to line out 58 or the signal from line input 55 is coupled to speaker output 59. A truth table is included in block 57. Blocks 61 and 62 represent other circuitry for processing signals, such as echo cancellation circuitry.

If the outputs from detectors 51 and 54 are both logic "0", then the signal flow is not changed. Similarly, if the outputs from detectors 51 and 54 are both logic "1", then the signal flow is not changed. If the outputs from detectors 51 and 54 are not the same, then the output of decoder 57 is set to a particular value, whether or not it happens to be the same as the previous value.

If the output from detector 51 is a logic "1", i.e. voice is detected on the microphone input, and the output from detector 54 is a logic "0", then the output of decoder 57 is set to logic "0", which couples the signal from microphone input 52 to line output 58. If the output from detector 54 is a logic "1", i.e. voice is detected on the line input, and the output from detector 51 is a logic "0", then the output of decoder 57 is set to logic "1", which couples the signal from line input 5S to speaker output S9. The signals from the voice activity detectors 51 and 54 and from decoder 57 can be used for other control functions in addition to the ones described.

Figure 6:
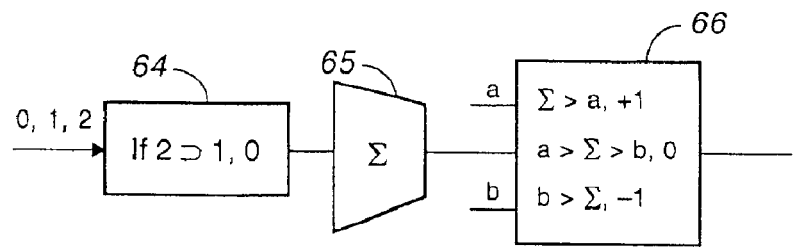
FIG. 6 is a block diagram of a circuit for adjusting peak threshold.

FIG. 6 is a block diagram of a preferred embodiment of a circuit for adjusting the peak threshold (threshold 27 in FIG. 3). Logic circuit 64 can be coupled to one of several places in FIG. 1 and receives two-bit binary signals representing either 0, 1, or 2. Circuit 64 converts this data into a single bit according to the following logic. If the input is a 2, then the output is a 1, else the output is zero. An AND gate coupled to the outputs of comparators 15 and 16 will perform this function. Successive data is summed in accumulator 65. In one embodiment of the invention data was accumulated for 12,000 numbers, which takes approximately 1.5 seconds with an 8 kHz clock. The number of numbers is programmable.

The sum in accumulator 65 is compared with two thresholds in comparator 66. A truth table is also shown in the block representing comparator 66. If the sum is greater than the higher threshold (a), the peak threshold is incremented by one. If the sum is between the higher threshold and the lower threshold (b), then nothing is done or the threshold is changed by zero. If the sum is less than the lower threshold, the peak threshold is decreased by one. This is a preferred embodiment of the invention, unlike the embodiment of FIG. 1, which uses only one threshold for comparison.

Figure 7:
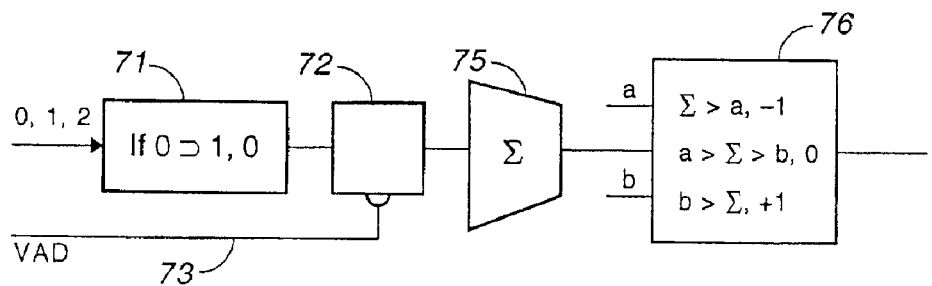
FIG. 7 is a block diagram of a circuit for adjusting noise threshold.

FIG. 7 is a block diagram of a preferred embodiment of a circuit for adjusting the noise threshold (threshold 26 in FIG. 3). Logic circuit 71 is coupled to a quantizer for receiving signal data represented as 0, 1, or 2. If the data is a logic "0", the output is a logic "1", else the output is a logic "0". This one-bit binary data is summed in accumulator 75, except that no data is added if the output from a voice activity detector is a logic "1", indicating the presence of a voice signal. Line 73 couples the VAD signal to an enable input on block 72, which interrupts the count if disabled.

The sum in accumulator 75 is compared with two thresholds in comparator 76. A truth table is also shown in the block representing comparator 76. If the sum is greater than the higher threshold (a), the noise threshold is decremented by one. If the sum is between the higher threshold and the lower threshold (b), then nothing is done or the threshold is changed by zero. If the sum is less than the lower threshold, the noise threshold is incremented by one. This is a preferred embodiment of the invention, unlike the embodiment of FIG. 1, which uses only one threshold for comparison. Thresholds (a) and (b) are not necessarily the same for FIGS. 6 and 7 and need not be adjusted in steps of one. One can make the circuit converge more quickly with a larger increment but the circuit is more stable with an increment of one.

Figure 8:
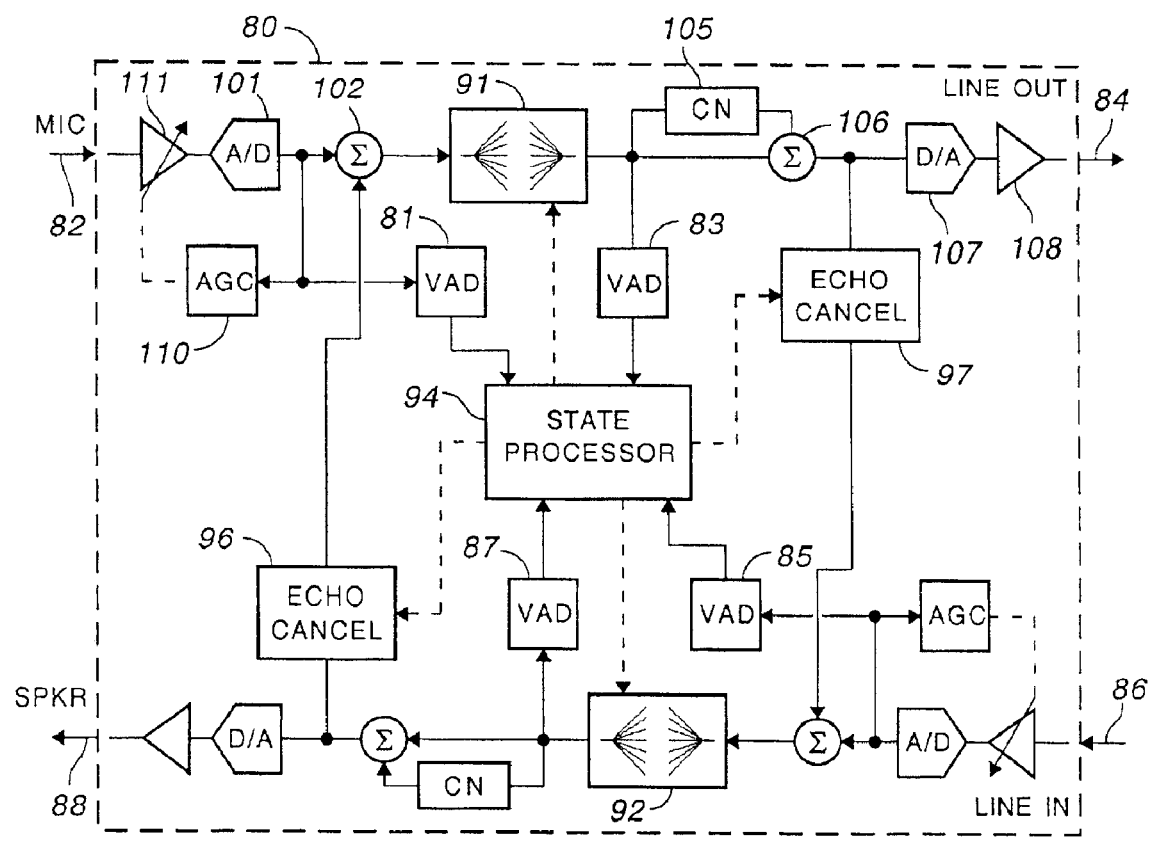
FIG. 8 is a block diagram of a telephone constructed in accordance with a preferred embodiment of the invention.

FIG. 8 is a block diagram of a telephone constructed in accordance with a preferred embodiment of the invention in which voice activity detectors combine with spectral slicing to provide reliable data for activation of echo cancelling equipment. "Spectral slicing" refers to the use of a plurality of band pass filters to divide the voice band of a telephone into a plurality of sub-bands, preferably such as disclosed in above-identified copending application Ser. No. 09/476,468.

Telephone 80 includes voice activity detector 81 coupled to microphone input 82, voice activity detector 83 coupled to line output 84, voice activity detector 85 coupled to line input 86, and voice activity detector 87 coupled to speaker output 88. In particular, voice activity detector 83 is coupled to the output of band pass filter bank 91 and voice activity detector 87 is coupled to the output of band pass filter bank 92. The outputs of the four voice activity detectors are coupled to state processor 94, which controls filter bank 91, filter bank 92, echo cancelling circuit 96, and echo cancelling circuit 97. The dashed lines represent control lines rather than signal or data lines.

The four data inputs are decoded into sixteen machine states by the state processor as follows.

State Table

| A | B | C | D | DT | Rx | Tx | Q |
|---|---|---|---|----|----|----|---|
| 1 | 1 | 1 | 1 | 1  | 0  | 0  | 0 |
| 1 | 1 | 1 | 0 | 0  | 0  | 1  | 0 |
| 1 | 1 | 0 | 1 | 0  | 0  | 1  | 0 |
| 1 | 1 | 0 | 0 | 0  | 0  | 1  | 0 |
| 1 | 0 | 1 | 1 | 0  | 1  | 0  | 0 |
| 1 | 0 | 1 | 0 | 0  | 1  | 0  | 0 |
| 1 | 0 | 0 | 1 | 1  | 0  | 0  | 0 |
| 1 | 0 | 0 | 0 | 0  | 0  | 1  | 0 |
| 0 | 1 | 1 | 1 | 1  | 0  | 0  | 0 |
| 0 | 1 | 1 | 0 | 1  | 0  | 0  | 0 |
| 0 | 1 | 0 | 1 | 1  | 0  | 0  | 0 |
| 0 | 1 | 0 | 0 | 0  | 0  | 0  | 1 |
| 0 | 0 | 1 | 1 | 0  | 1  | 0  | 0 |
| 0 | 0 | 1 | 0 | 0  | 1  | 0  | 0 |
| 0 | 0 | 0 | 1 | 0  | 1  | 0  | 0 |
| 0 | 0 | 0 | 0 | 0  | 0  | 0  | 1 |

In one embodiment of the invention, the state processor was an array of logic gates producing the outputs indicated; i.e. fixed or hard coded logic was used. While sufficient for many applications, programmable logic can be used instead. In the table, "A" is the output from voice activity detector 81, "B" is the output from voice activity detector 83, "C" is the output from voice activity detector 85, and "D" is the output from voice activity detector 87. "DT" is a double talk state, "Rx" is a receive state, "Tx" is a transmit state, and "Q" is a quiet state.

As described above, the voice activity detectors can be separately adjusted for a particular application. In the embodiment illustrated in FIG. 8, voice activity detectors 81 and 85 have the same default values and voice activity detectors 83 and 87 have the same default values. In particular, voice activity detectors 83 and 87 exaggerate the difference between low amplitude signals and high amplitude signals more than voice activity detectors 81 and 85. High amplitude signals are given a weight of four rather than two. In part, this is because filter banks 91 and 92 attenuate the signals passing through and some compensation is needed.

Figure 9:
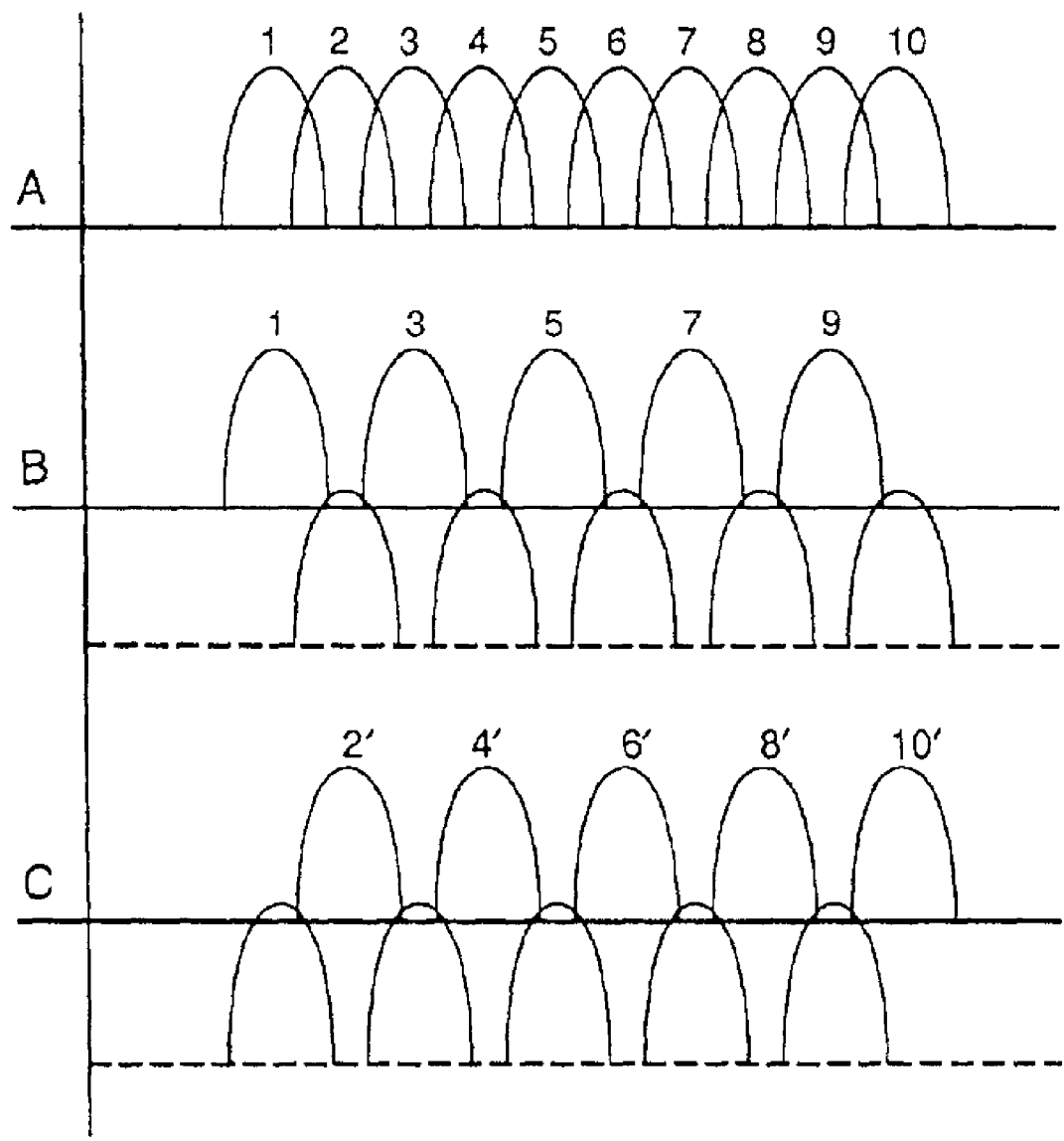
FIG. 9 is a chart illustrating a portion of the operation of the telephone illustrated in FIG. 8.

The following describes signal flow through the transmit channel (input 82 to output 84). The receive channel works in the same way. A new voice signal entering microphone input 82 may or may not be accompanied by a signal from speaker output 88. The signals from input 82 are digitized in 16-bit A/D converter 101 and coupled to summation network 102. There is, as yet, no signal from echo cancelling circuit 96 and the data proceeds to filter bank 91. All filters are initially set to minimum attenuation, as illustrated in FIG. 9 by line A. Voice activity detector 83, looking at the six most significant bits, senses a large output that could possibly contain an echo and causes filter bank 91 to go to the state illustrated by line B in FIG. 9. Filter bank 92 is changed to the state shown by line C in FIG. 9, where the primes indicate filter bank 92.

The filter banks are now configured as complementary comb filters. The signal from microphone input 82 has its spectrum reduced to the pass bands of half the filters in filter bank 91. Similarly, the signal from line input 86 has its spectrum reduced to the pass bands of half the filters in filter bank 92. A full spectrum signal passing through either filter bank alone is attenuated approximately −3 dB. A signal passing through filter bank 92 and then through filter bank 91, configured as complementary comb filters, is attenuated approximately −15 dB.

After the filter banks are configured as complementary comb filters, two things can happen. The signal through filter bank 91 might now be attenuated approximately −3 dB, indicating new voice, or the signal could be attenuated by more than −3 dB, indicating significant content from the receive side. The situation is now ambiguous because the content from the receive side could be double talk or echo. Voice activity detectors 85 and 87 remove this ambiguity.

If voice activity detector 85 indicates voice but voice activity detector 87 no longer indicates voice, then there was an echo and it is safe to turn on echo canceller 96. If voice activity detector 85 indicates voice and voice activity detector 87 still indicates voice, then there was doubletalk and echo canceller 96 remains off.

Note that the difference in attenuations reliably distinguishes doubletalk from echo, a feature not available in the prior art. By avoiding premature application of echo cancelling techniques, one avoids divergence (failure of control loops to lock) and distortion of the voice signals, which happens if echo cancelling is applied when there is no echo.

The invention thus solves a major problem in the prior art. While particular embodiments of voice activity detector and filter bank have been identified and are preferred, the invention will work with other forms of voice activity detector and filter bank. The data from the voice activity detectors can be used to control other devices within telephone 80, such as comfort noise generator 105. If neither voice activity detector 81 nor voice activity detector 83 detects voice, comfort noise is preferably added to or substituted for the filtered signal in summation network 106. D/A converter 107 converts the signal back to analog and amplifier 108 provides impedance matching and proper level for line output 84. On the input side, automatic gain control 110 and amplifier 111 maintain the input signal within a suitable range for A/D converter 101.

Depending upon the state of the machine, the gain of some filters in each bank can be adjusted as disclosed in above-identified copending application Ser. No. 09/476.468. The result is no longer complementary comb filters but filter banks that provide the maximum possible spectral content under the particular circumstances found by the voice activity detectors.

The invention thus provides an improved method for analyzing the energy content of an incoming signal and, in particular, provides a simple but effective circuit for detecting voice. The circuit includes dynamically adjustable thresholds for analyzing energy content of a speech signal and does not require large amounts of data for reliably detecting a voice signal. When combined with spectral slicing, one obtains a very reliable indication of when to use echo cancelling circuitry. The echo cancelling circuitry may take any form known in the art wherein a modeled filter response of a signal is subtracted from the signal to eliminate an echo.

Having thus described the invention, it will be apparent to those of skill in the art that various modifications can be made within the scope of the invention. For example, the actual signal levels representing a logic "0" or a logic "1" is a matter of choice, as long as the choice is consistently made. The various default values can be varied to suit particular applications. Although described in the context of a telephone, the invention can be used for processing any type of signal; e.g. from a geophone in geophysical prospecting, where one may want to enhance rather than suppress echoes, or somatic sounds in an electronic stethoscope.

What is claimed as the invention is:

1. A method for analyzing the energy content of an electrical signal for detecting voice, said method comprising the steps of:
    (a) defining a first voltage threshold and a second voltage threshold, wherein the first threshold is greater than the second threshold;
    (b) comparing the signal with the first voltage threshold and the second voltage threshold to produce a digital number representative of the signal;
    (c) repeating steps (a) and (b) to produce a plurality of numbers;
    (d) converting the plurality of numbers into a first sum; and
    (e) comparing the first sum to a third threshold, wherein a sum exceeding the third threshold is indicative of a voice signal.

2. The method as set forth in claim 1 wherein said converting step includes the steps of:
    weighting each number representative of a signal; and
    summing the weighted numbers.

3. The method as set forth in claim 2 wherein larger numbers receive greater weight than smaller numbers to produce a quasi-RMS calculation.

4. The method as set forth in claim 1 and further including the steps of:
    counting the number of numbers that exceed the first threshold;
    comparing the number to a fourth threshold; and
    indicating a voice signal when the first sum exceeds the third threshold and the number exceeds the fourth threshold.

5. The method as set forth in claim 1 and further including the steps of:
    counting the number of numbers that exceed the first threshold;
    comparing the number to a fourth threshold; and
    increasing the first threshold when the number is greater than the fourth threshold.

6. The method as set forth in claim 1 and further including the steps of:
    counting the number of numbers that are less than the second threshold;
    comparing the number to a fourth threshold; and
    decreasing the second threshold when the number is less than the fourth threshold.

7. The method as set forth in claim 6 and further including the step of:
    not counting the number of numbers that are less than the second threshold while the first sum exceeds the third threshold.

8. A method for analyzing the energy content of an analog electrical signal, said method comprising the steps of:
    (a) defining a first voltage threshold and a second voltage threshold, wherein the first threshold is greater than the second threshold;
    (b) comparing the analog electrical signal with the first voltage threshold and the second voltage threshold to produce a digital number representative of the signal;
    (c) repeating steps (a) and (b) to produce a plurality of numbers;
    (d) converting the plurality of numbers into a sum.

9. The method as set forth in claim 8 wherein said converting step includes the steps of:
    weighting each number representative of a signal; and
    summing the weighted numbers.

10. The method as set forth in claim 9 wherein larger numbers receive greater weight than smaller numbers to produce a quasi-RMS calculation.

* * * * *